(12) United States Patent
Funayama et al.

(10) Patent No.: US 10,454,348 B2
(45) Date of Patent: Oct. 22, 2019

(54) STATOR FOR ROTATING ELECTRICAL MACHINE

(71) Applicant: AISIN AW CO., LTD., Anjo-shi, Aichi-ken (JP)

(72) Inventors: Tetsuya Funayama, Okazaki (JP); Tsuyoshi Miyaji, Toyohashi (JP)

(73) Assignee: AISIN AW CO., LTD., Anjo (JP)

(*) Notice: Subject to any disclaimer, the term of this patent is extended or adjusted under 35 U.S.C. 154(b) by 127 days.

(21) Appl. No.: 15/742,469

(22) PCT Filed: Aug. 3, 2016

(86) PCT No.: PCT/JP2016/072731
§ 371 (c)(1),
(2) Date: Jan. 5, 2018

(87) PCT Pub. No.: WO2017/047263
PCT Pub. Date: Mar. 23, 2017

(65) Prior Publication Data
US 2018/0205296 A1    Jul. 19, 2018

(51) Int. Cl.
*H02K 11/00* (2016.01)
*H02K 11/25* (2016.01)
(Continued)

(52) U.S. Cl.
CPC .............. *H02K 11/25* (2016.01); *H02K 1/16* (2013.01); *H02K 3/50* (2013.01)

(58) Field of Classification Search
CPC ............. H02K 11/25; H02K 1/16; H02K 3/50
(Continued)

(56) References Cited

U.S. PATENT DOCUMENTS

| 2003/0218394 A1 | 11/2003 | Hashiba et al. |
| 2011/0068647 A1* | 3/2011 | Sakaue .................. H02K 3/28 310/71 |

(Continued)

FOREIGN PATENT DOCUMENTS

| CN | 203457001 U | 2/2014 |
| EP | 0 727 864 A2 | 8/1996 |

(Continued)

OTHER PUBLICATIONS

Nov. 1, 2016 International Search Report issued in International Patent Application No. PCT/JP2016/072731.
(Continued)

*Primary Examiner* — Thanh Lam
(74) *Attorney, Agent, or Firm* — Oliff PLC (57) ABSTRACT

A stator that includes a core having a plurality of slots extending in an axial direction and arranged in a circumferential direction; and a coil wound in the core, wherein the coil includes slot accommodated portions that are placed in the slots, a coil end portion that projects from the core in the axial direction, and a plurality of jumper portions that are extended from the slot accommodated portions and disposed outside the coil end portion in the axial direction and that are at least either first jumper portions connected to a neutral terminal that forms a neutral point and second jumper portions connected to a power line terminal that is connected to a power supply.

14 Claims, 7 Drawing Sheets

(51) Int. Cl.
*H02K 3/50* (2006.01)
*H02K 1/16* (2006.01)

(58) Field of Classification Search
USPC .......................... 310/71, 179–180, 184, 186
See application file for complete search history.

(56) References Cited

U.S. PATENT DOCUMENTS

| | | | |
|---|---|---|---|
| 2011/0156512 A1* | 6/2011 | Shimomura | H02K 1/148 310/71 |
| 2012/0019081 A1 | 1/2012 | Tamura et al. | |
| 2012/0086292 A1 | 4/2012 | Ishida et al. | |
| 2013/0270973 A1 | 10/2013 | Ikemoto | |
| 2014/0210286 A1* | 7/2014 | Guercioni | H02K 3/28 310/71 |
| 2015/0061450 A1* | 3/2015 | Nakagawa | H02K 3/12 310/198 |
| 2016/0285334 A1* | 9/2016 | Turnbull | H02K 3/28 |
| 2018/0351427 A1* | 12/2018 | Kuroyanagi | H02K 15/066 |

FOREIGN PATENT DOCUMENTS

| | | |
|---|---|---|
| EP | 1 109 289 A2 | 6/2001 |
| EP | 1 126 579 A1 | 8/2001 |
| JP | S53-148102 U | 11/1978 |
| JP | H11-234964 A | 8/1999 |
| JP | 2007-097262 A | 4/2007 |
| JP | 2008-029127 A | 2/2008 |
| JP | 2008-131775 A | 6/2008 |
| JP | 2008-295162 A | 12/2008 |
| JP | 2011-04496 A | 1/2011 |
| JP | 2013-051807 A | 3/2013 |

OTHER PUBLICATIONS

Apr. 25, 2018 Search Report issued in European Patent Application No. 16846136.6.

* cited by examiner

STATOR FOR ROTATING ELECTRICAL MACHINE

BACKGROUND

The present disclosure relates to stators for rotating electrical machines.

A stator described in Japanese Patent Application Publication No. JP 2007-97262 (JP 2007-97262 A) is known as a stator for a rotating electrical machine. JP 2007-97262 A discloses a technique that improves flexibility in arrangement of coil-to-coil jumper wires (300) each connecting an inner coil (100) and an outer coil (200) in series in the configuration including inner coils (100) disposed in the inner parts in the radial direction of slots and outer coils (200) disposed in the outer parts in the radial direction of the slots. Specifically, each head jumper portion (305) that connects two tilted jumper portions (303, 304) in the coil-to-coil jumper wire (300) includes a direction changing portion that reverses the direction in which the head jumper portion (305) extends in the circumferential direction, whereby the two tilted jumper portions (303, 304) can be made to be tilted in the same direction in the circumferential direction. JP 2007-97262 A describes that such a configuration allows the coil-to-coil jumper wires (300) to be disposed at positions where conventional coil-to-coil jumper wires cannot be disposed.

For example, there is a case where not only such coil-to-coil jumper wires (300) but also a neutral terminal forming a neutral point and a power line terminal connecting to a power supply are disposed at an axial outer end of a coil end portion. A plurality of jumper portions (jumper wires) corresponding to at least the number of coil phases are connected to the neutral terminal. In the case where a single phase coil includes a plurality of coil portions connected in parallel with each other, in the case where a plurality of liner conductors are wound in bundles in a core, etc., the plurality of jumper portions may also be connected to the power line terminal. In the case where such a plurality of jumper portions are connected at the neutral terminal or the power line terminal by crimping etc., the plurality of jumper portions are usually required to extend in the same direction. One method to make the plurality of jumper portions extend in the same direction is to form in the jumper portion folded-back portions that reverse the direction in which the jumper portion extends, like, e.g., the direction changing portions of the coil-to-coil jumper wires (300) described in JP 2007-97262 A. In this case, however, since space for folding back is required, the neutral terminal or the power line terminal need to be disposed away from the coil end portion in the axial direction, whereby size in the axial direction of the stator may be increased accordingly.

SUMMARY

An exemplary aspect of the disclosure implements a stator for a rotating electrical machine which can achieve reduction in size in axial direction while avoiding an increase in manufacturing cost.

In view of the above, a stator for a rotating electrical machine includes a core having a plurality of slots extending in an axial direction and arranged in a circumferential direction, and a coil wound in the core, wherein the coil includes slot accommodated portions that are placed in the slots, a coil end portion that projects from the core in the axial direction, and a plurality of jumper portions that are extended from the slot accommodated portions and disposed outside the coil end portion in the axial direction and that are at least either first jumper portions connected to a neutral terminal that forms a neutral point and second jumper portions connected to a power line terminal that is connected to a power supply, and each of the jumper portions is disposed so as to extend from a connection portion with the slot accommodated portion toward a first side in the circumferential direction along a coil-end end face that is an end face in the axial direction of the coil end portion, the first side in the circumferential direction being one side in the circumferential direction.

With the above characteristic configuration, each of the jumper portions is disposed so as to extend from the connection portion with the slot accommodated portion toward the first side in the circumferential direction along the coil-end end face, namely so as to extend toward the same side in the circumferential direction. Accordingly, for example, in the case where the neutral terminal to which the plurality of first jumper portions are connected is disposed outside the coil end portion in the axial direction, the plurality of first jumper portions can be made to extend toward the same side in the circumferential direction by merely disposing the plurality of first jumper portions so that each of the first jumper portions extends to a position in the circumferential direction which corresponds to a position where the neutral terminal is disposed. That is, the plurality of first jumper portions can be connected at the neutral terminal without forming in the first jumper portions folded-back portions that reverse the direction in which the first jumper portions extend in the circumferential direction. Accordingly, the neutral terminal can be disposed closer to the coil-end end face as compared to the case where such folded-back portions are formed in the first jumper portions, whereby reduction in size in the axial direction of the stator can be achieved. Similarly, for example, in the case where the power line terminal to which the plurality of second jumper portions are connected is disposed outside the coil end portion in the axial direction, the plurality of second jumper portions can be made to extend toward the same side in the circumferential direction by merely disposing the plurality of second jumper portions so that each of the second jumper portions extends to a position in the circumferential direction which corresponds to a position where the power line terminal is disposed. That is, the plurality of second jumper portions can be connected at the power line terminal without forming in the second jumper portions folded-back portions that reverse the direction in which the second jumper portions extend in the circumferential direction. Accordingly, the power line terminal can be disposed closer to the coil-end end face as compared to the case where such folded-back portions are formed in the second jumper portions, whereby reduction in size in the axial direction of the stator can be achieved. Since each of the jumper portions is merely disposed so as to extend from the connection portion with the slot accommodated portion toward the first side in the circumferential direction along the coil-end end face, this configuration does not require any special processing and does not significantly affect manufacturing cost.

According to the above configuration, a stator for a rotating electrical machine can be implemented which can achieve reduction in size in the axial direction while avoiding an increase in manufacturing cost.

Further features and advantages of the stator for the rotating electrical machine will become more apparent from

DETAILED DESCRIPTION OF EMBODIMENTS

Embodiments of a stator for a rotating electrical machine will be described with reference to the accompanying drawings. The term "rotating electrical machine" is used as a concept including all of a motor (electric motor), a generator (electric generator), and a motor-generator that functions as both a motor and a generator as needed. In the present embodiment, the terms regarding the dimensions of each component, the direction in which each component is placed, the position of each component, etc. are used as a concept including variation due to tolerance (permissible manufacturing tolerance).

In the following description, the "axial direction L," the "circumferential direction C," and the "radial direction R" are defined based on a core 10, that is, based on the axis A of the core 10 (see FIG. 1), unless otherwise specified. The "first side C1 in the circumferential direction" refers to one side in the circumferential direction C, and the "second side C2 in the circumferential direction" refers to the opposite side to the first side C1 in the circumferential direction (the other side in the circumferential direction C).

Figure 1:
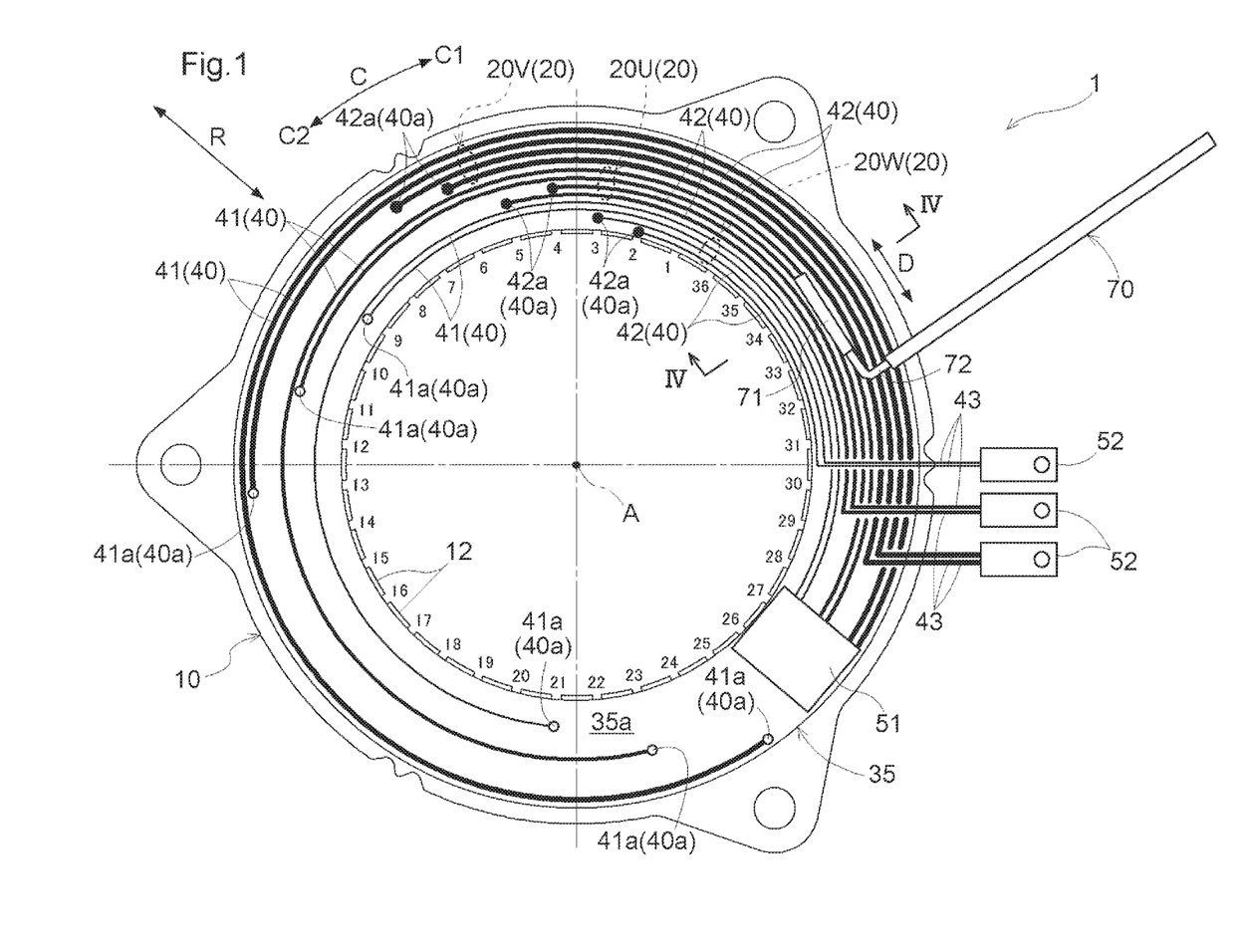
FIG. 1 is a view schematically showing the arrangement and configuration of jumper portions of a coil and a temperature detection device with respect to a core according to an embodiment.
Figure 4:
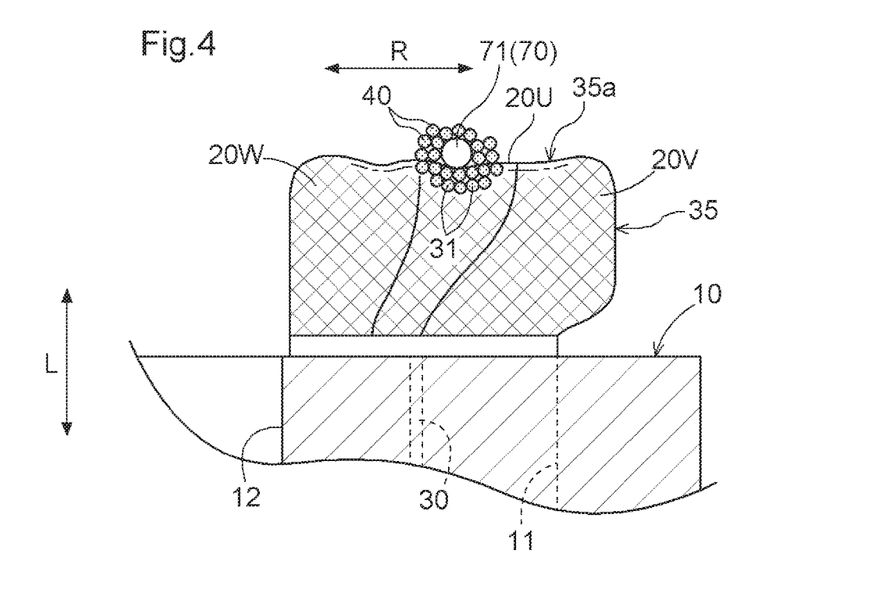
FIG. 4 is a section taken along line IV-IV in FIG. 1.

As shown in FIG. 1, a stator 1 for a rotating electrical machine includes a core 10 and a coil 20 wound in the core 10. As described in detail later, in the present embodiment, the stator 1 includes a temperature detection device 70 (temperature detector) that detects the temperature of the coil 20. The core 10 is made of a magnetic material. For example, the core 10 is formed by stacking a plurality of magnetic material sheets (e.g., electrical steel sheets such as silicon steel sheets) or the core 10 is mainly made of a green compact produced by pressing powder of a magnetic material. The coil 20 is formed by linear conductors (conductor wires), namely conductors having a linear shape. The linear conductors are made of a conductive material such as copper or aluminum. The linear conductors have on their surfaces an insulating coating made of an electrically insulating material such as resin. The linear conductors used in the present embodiment are linear conductors having a circular section perpendicular to the direction in which the linear conductor extends. In FIG. 1, a coil end portion 35 that will be described later is shown in a simplified form, and FIG. 1 shows only the outer peripheral surface (the outer surface in the radial direction R) and the inner peripheral surface (the inner surface in the radial direction R) of the coil end portion 35. In FIG. 1, regarding jumper portions 40 that will be described below, a plurality of jumper portions 40 are shown to extend in the circumferential direction C at different positions in the radial direction R in order to clearly show the regions in the circumferential direction C where the jumper portions 40 are located. The plurality of jumper portions 40 may actually be arranged so as to have portions crossing each other as viewed in the axial direction L. As schematically shown in FIG. 4, the plurality of jumper portions 40 are disposed such that adjacent ones of the jumper portions 40 are in contact with or close to each other.

In the present embodiment, the stator 1 is a stator for a rotating field type rotating electrical machine and functions as an armature. A rotor (not shown) serving as a field including permanent magnets, electromagnets, etc. is rotated by a magnetic field that is generated by the stator 1. In the present embodiment, the stator 1 is a stator for an inner rotor type rotating electrical machine, and the rotor is located inside the core 10 in the radial direction R. For example, the stator 1 is a stator for a rotating electrical machine that is mounted on a vehicle as a driving power source etc. for wheels.

Figure 2:
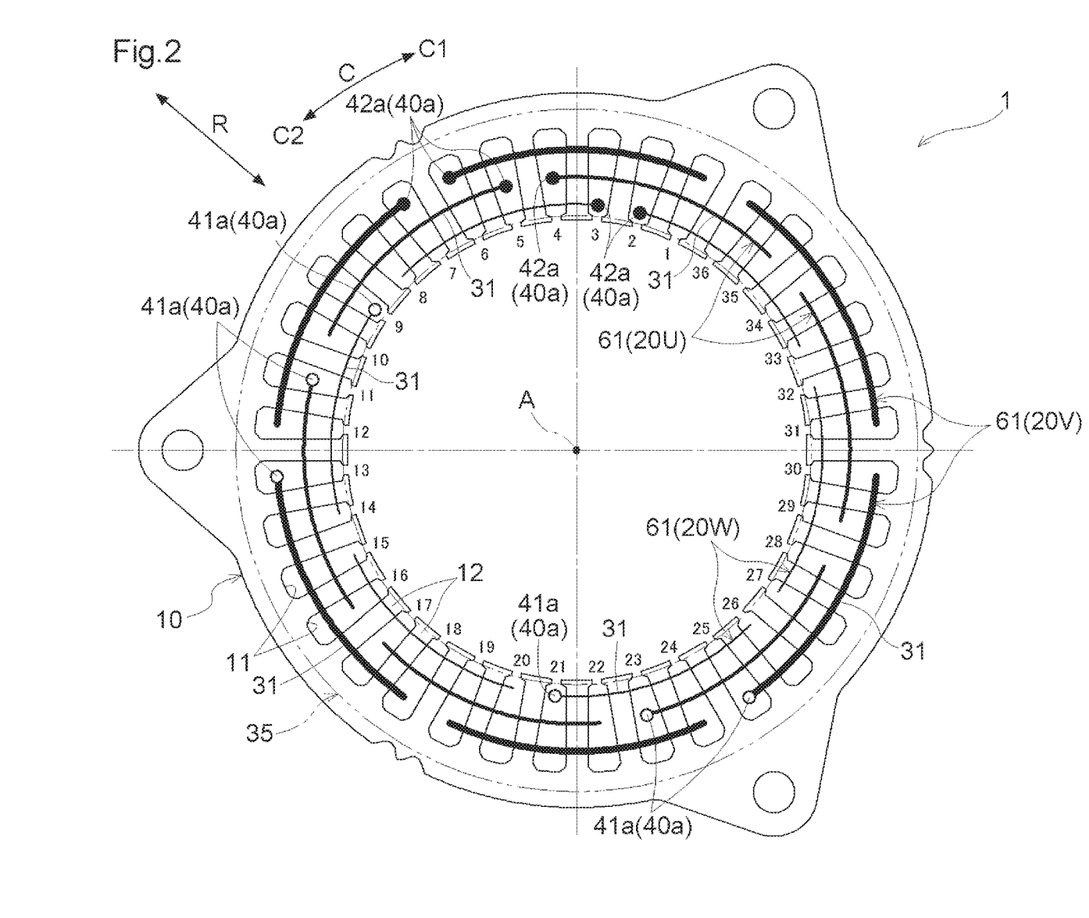
FIG. 2 is a view of the core according to the embodiment as viewed in the axial direction.
Figure 5:
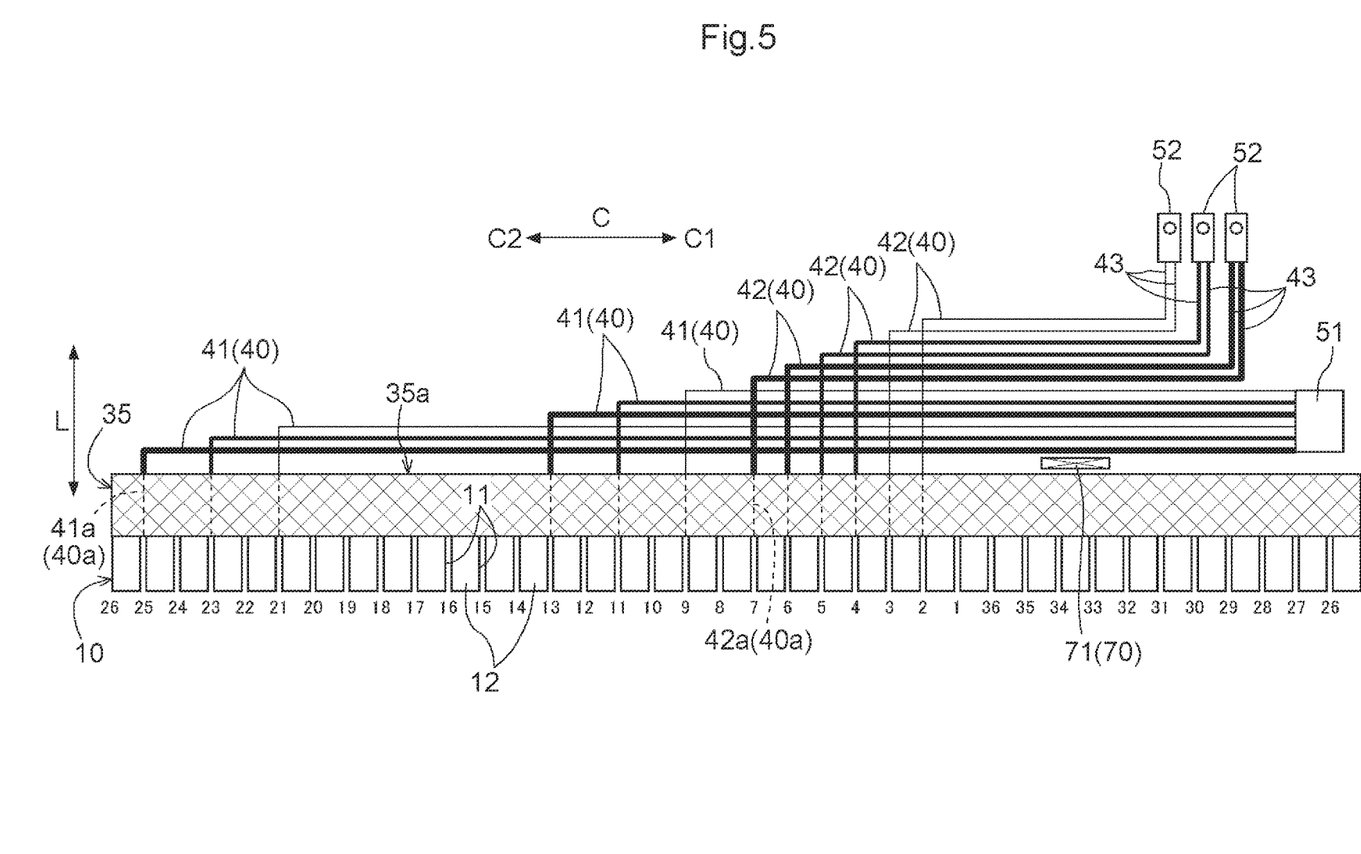
FIG. 5 is a development view showing the arrangement and configuration of the plurality of jumper portions according to the embodiment.

As shown in FIG. 2, the core 10 has a plurality of slots 11 extending in the axial direction L and arranged in the circumferential direction C. The plurality of slots 11 are distributed in the circumferential direction C. Each slot 11 has openings on both sides in the axial direction L. Each slot 11 is formed so as to extend in the radial direction R, and in the present embodiment, has an opening on the inner side in the radial direction R. In the present embodiment, the stator 1 is a stator for a rotating electrical machine that is driven by three-phase alternating currents, and the slots 11 for U-phase, the slots 11 for V-phase, and the slots 11 for W-phase are formed in the core 10 in a repeated pattern of U-phase, V-phase, and W-phase in the circumferential direction C. In the present embodiment, the number of slots per pole per phase is "2," and the slots 11 for each phase are formed in the core 10 in a repeated pattern of two slots for U-phase, two slots for V-phase, and two slots for W-phase in the circumferential direction C. In the present embodiment, the number of magnetic poles per phase is "6" (the number of magnetic pole pairs is "3"), and as shown in FIG. 2, a total of 36 (=2×6×3) slots 11 are formed in the core 10. In FIGS. 1, 2, and 5, in order to facilitate understanding, slot numbers shown toward the second side C2 in the circumferential direction correspond to the slots 11. Teeth 12 are formed between the slots 11 adjacent to each other in the circumferential direction C. The inner peripheral surface (the cylindrical surface concentric with an axis A) of the core 10 is formed by the inner end faces in the radial direction R of the plurality of teeth 12.

The coil 20 includes slot accommodated portions 30 (coil side portions) that are placed in the slots 11, coil end portions 35 that project from the core 10 in the axial direction L, and jumper portions 40. In the present embodiment, the stator 1 is used for a rotating electrical machine that is driven by three-phase alternating currents, and the coil 20 includes three-phase coils, namely U-phase coils 20U, V-phase coils 20V, and W-phase coils 20W. As shown in FIG. 4, the slot accommodated portion 30 is placed so as to extend in the slot 11 in the axial direction L. Although a plurality of slot accommodated portions 30 are placed in a single slot 11, only one slot accommodated portion 30 is representatively shown in FIG. 4. The coil 20 includes connection portions 31 each located outside the core 10 in the axial direction L and connecting a pair of slot accommodated portions 30. As shown in FIG. 2, each connection portion 31 connects a pair of slot accommodated portions 30 placed in different slots 11 (in this example, a pair of slots 11 separated from each other by the distance that is five times the slot pitch). In FIG. 2, in order to facilitate understanding of the arrangement and configuration of the coil 20 for each phase (U-phase coils 20U, V-phase coils 20V, and W-phase coils 20W) in the core 10, a single line segment connecting a pair of slots 11 collectively shows a plurality of connection portions 31 each connecting a pair of slot accommodated portions 30 placed in the pair of slots 11.

The coil end portion 35 is formed by a collection of a plurality of connection portions 31. That is, the coil end portion 35 is a collection of the connection portions 31, and the outer shape of the coil end portion 35 is determined by the outer shape of the collection of the connection portions 31. FIG. 4 shows only a part of the connection portions 31 forming the coil end portion 35. The coil end portion 35 is formed on both sides in the axial direction L of the core 10 so as to project from the core 10 in the axial direction L. As shown in FIG. 4, in the present embodiment, the region in the radial direction R where the connection portions 31 of the U-phase coils 20U are located is set between the region in the radial direction R where the connection portions 31 of the V-phase coils 20V are located and the region in the radial direction R where the connection portions 31 of the W-phase coils 20W are located.

As shown in FIGS. 4 and 5, the jumper portions 40 are extended from the slot accommodated portions 30 and are located outside the coil end portion 35 in the axial direction L (on the opposite side from the core 10). That is, as shown in FIG. 5, each jumper portion 40 includes a connection portion 40a connecting to the slot accommodated portion 30, and a part of each jumper portion 40 which is located on the opposite side of the connection portion 40a from the slot accommodated portion 30 is placed outside the coil end portion 35 in the axial direction. The connection portion 40a is a part of the jumper portion 40 which is present in the coil end portion 35, that is, a part of the jumper portion 40 which is located inside a coil-end end face 35a in the axial direction L (on the core 10 side). The coil-end end face 35a is an end face in the axial direction L (outer end face in the axial direction L) of the coil end portion 35. In FIG. 5, a plurality of jumper portions 40 are shown to extend in the circumferential direction C at different positions in the axial direction L in order to clearly show the regions in the circumferential direction C where the jumper portions 40 are located. As shown in FIG. 4, each jumper portion 40 may actually be placed so as to have a portion overlapping other jumper portions 40 as viewed in the radial direction R. In the present embodiment, the jumper portions 40 are integral with the slot accommodated portions 30. That is, the jumper portion 40 and the slot accommodated portion 30 which are connected through the connection portion 40a are formed by shaping a single continuous linear conductor.

Figure 8:
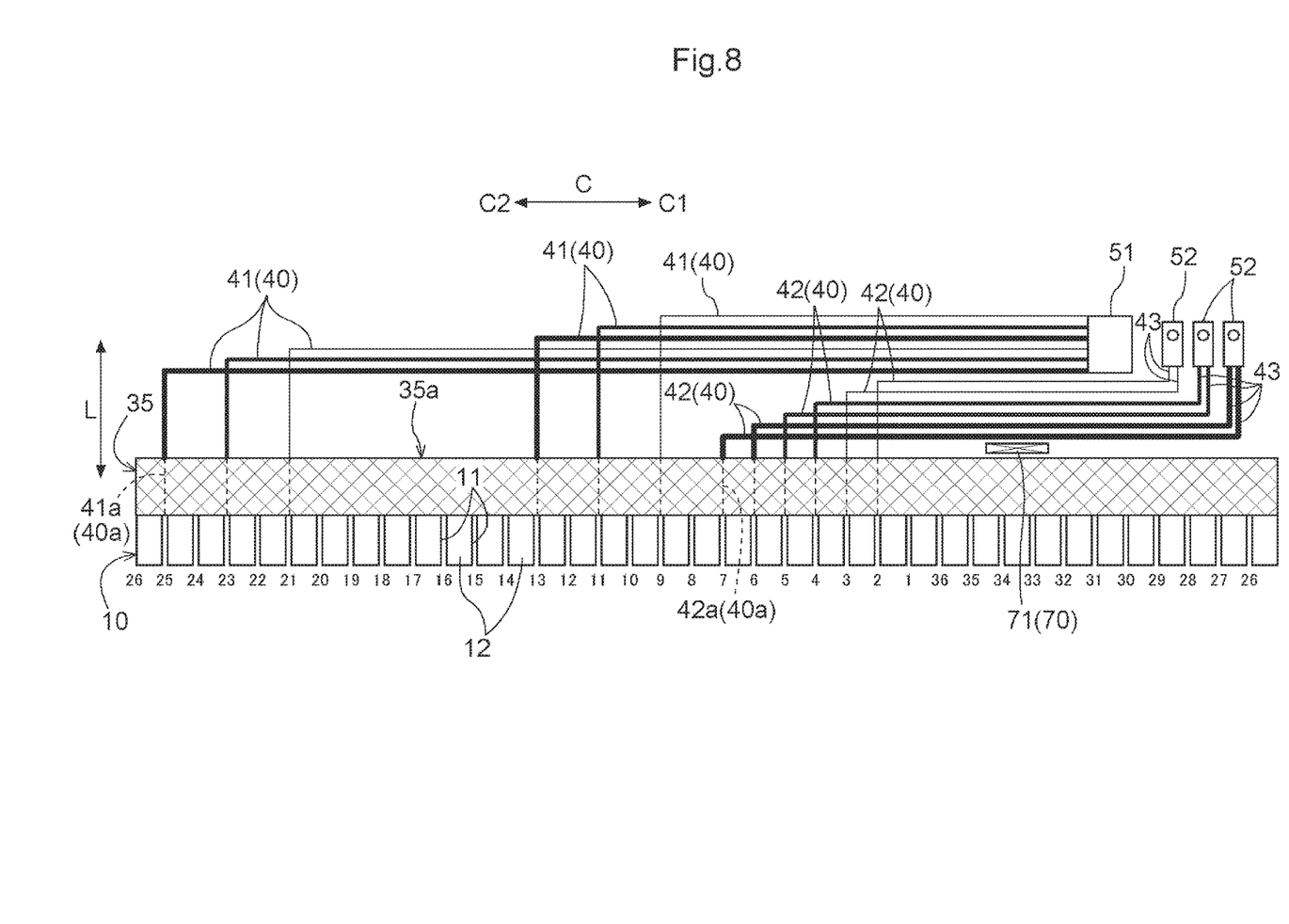
FIG. 8 is a development view showing the arrangement and configuration of the plurality of jumper portions according to that another embodiment.

The coil 20 includes a plurality of jumper portions 40 that are at least either first jumper portions 41 or second jumper portions 42. That is, the plurality of jumper portions 40 include at least either the first jumper portions 41 or the second jumper portions 42. As shown in FIG. 1, the first jumper portions 41 are those jumper portions 40 connected a neutral terminal 51 that forms a neutral point 50 (see FIG. 3). Each of the first jumper portions 41 includes a first connection portion 41a as a connection portion 40a. The second jumper portions 42 are those jumper portions 40 connected to power line terminals 52 that are connected to a power supply (not shown). Each second jumper portion 42 includes a second connection portion 42a as a connection portion 40a. In the present embodiment, the coil 20 is comprised of a plurality of phase coils (in this example, U-phase coils 20U, V-phase coils 20V, and W-phase coils 20W) connected in star, and the plurality of jumper portions 40 include both the first jumper portions 41 and the second jumper portions 42. That is, in the present embodiment, the coil 20 includes both a plurality of first jumper portions 41 and a plurality of second jumper portions 42. As shown in FIG. 1, in the present embodiment, each of the plurality of second jumper portions 42 is connected to the power line terminal 52 through an extended portion 43 extended to one side in the radial direction R (in the present embodiment, the outside in the radial direction R) of the coil end portion 35. As shown in FIG. 1, in the present embodiment, the power line terminals 52 are disposed on one side in the radial direction R (in the present embodiment, the outside in the radial direction R) of the coil end portion 35. In FIG. 5 and FIG. 8 that will be referred to later, the power line terminals 52 are shown to be located outside the coil end portion 35 in the axial direction L in order to facilitate understanding of the configuration of each jumper portion 40. As shown in FIGS. 1 and 5, in the present embodiment, the neutral terminal 51 is disposed so that the entire neutral terminal 51 is located in a region located outside the coil end portion 35 in the axial direction L and overlapping the core 10 (between the inner peripheral surface of the core 10 and the outer peripheral surface of the core 10 in the radial direction R) as viewed in the axial direction L. In the present embodiment, the power line terminals 52 are disposed so that the entire power line terminals 52 do not overlap the core 10 as viewed in the axial direction L.

As shown in FIG. 1, each of the jumper portions 40 is disposed so as to extend from the connection portion 40a with the slot accommodated portion 30 toward the first side C1 in the circumferential direction (that is, toward the same side in the circumferential direction C) along the coil-end end face 35a. The jumper portions 40 that are mentioned here are those jumper portions 40 which are located on the same side in the axial direction L of the core 10 as a temperature measurement unit 71 (temperature measurer) of a temperature detection device 70. That is, each of the jumper portions 40 located on the same side in the axial direction L of the core 10 as the temperature measurement unit 71 is disposed so as to extend from the connection portion 40a toward the first side C1 in the circumferential direction along the coil-end end face 35a. In the present embodiment, both the first jumper portions 41 and the second jumper portions 42 are located on the same side in the axial direction L of the core 10 as the temperature measurement unit 71. Each of the first jumper portions 41 located on the same side in the axial direction L of the core 10 as the temperature measurement unit 71 is disposed so as to extend from the first connection portion 41a toward the first side C1 in the circumferential direction along the coil-end end face 35a, and each of the second jumper portions 42 located on the same side in the axial direction L of the core 10 as the temperature measurement unit 71 is disposed so as to extend from the second connection portion 42a toward the first side C1 in the circumferential direction along the coil-end end face 35a.

Figure 3:
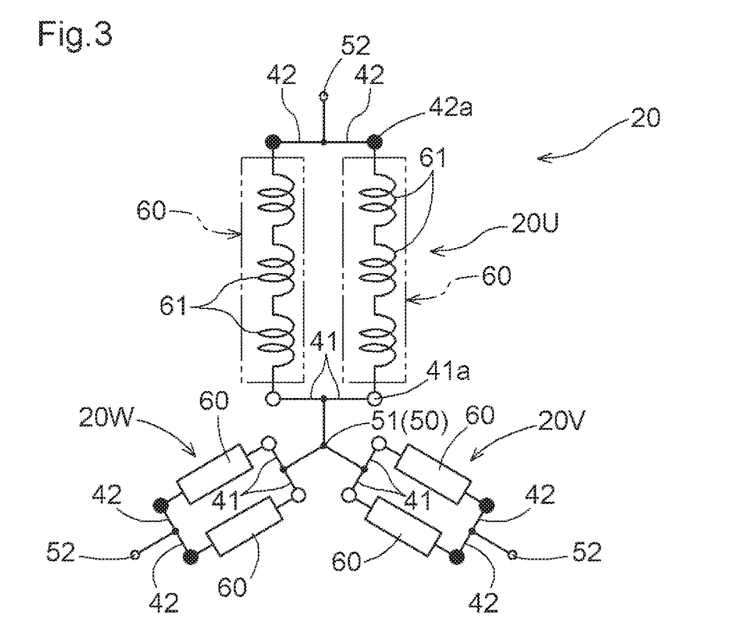
FIG. 3 is a diagram showing connection of the coil according to the embodiment.

In the present embodiment, the coil 20 is comprised of a plurality of phase coils (in this example, U-phase coils 20U, V-phase coils 20V, and W-phase coils 20W) connected in star. Accordingly, the coil 20 includes at least one first jumper portion 41 for each phase and at least one second jumper portion 42 for each phase. In the present embodiment, as shown in FIG. 3, each of the phase coils includes two coil portions 60 connected in parallel with each other. In the present embodiment, each coil portion 60 is formed by a plurality of concentric winding portions 61 (lap winding portions) connected in series with each other. Each coil portion 60 has a first jumper portion 41 at its one end and has a second jumper portion 42 at the other end. In the present embodiment, the coil 20 thus includes (2×M) first jumper portions 41 for each phase and (2×M) second jumper portions 42 for each phase. That is, in the present embodiment, the coil 20 includes (6×M) first jumper portions 41 and (6×M) second jumper portions 42, and thus includes a total of (12×M) jumper portions 40, where "M" represents the number of linear conductors forming a single bundle in the case where the linear conductors are wound in bundles in the core 10. That is, "M" is an integer equal to or larger than 1. For example, in the case where the linear conductors are wound in bundles of two in the core 10, M=2. For simplicity, FIG. 1 etc. shows the configuration in the case of M=1. As shown in an example of FIG. 1, the connection portions 40a of the plurality of jumper portions 40 included in the coil 20 are distributed in the circumferential direction C.

As shown in FIG. 4, in the present embodiment, the temperature measurement unit 71 of the temperature detection device 70 is placed between the coil-end end face 35a and the jumper portions 40. For example, the temperature measurement unit 71 is fixed to the coil end portion 35 with a binding member, an adhesive tape, an adhesive, etc. In FIG. 1, in order to facilitate understanding of the position of the temperature measurement unit 71, the temperature measurement unit 71 is shown to be located on the side closer to the viewer than the jumper portions 40. Detection signals from the temperature measurement unit 71 are output through a signal line 72 to a control device (not shown) such as a rotating electrical machine control device. For example, the temperature measurement unit 71 is provided with a heat sensitive element (not shown) such as a thermistor element or a thermocouple (specifically, a contact of the thermocouple). The thermistor element is an element whose resistance value changes according to a change in temperature. In the present embodiment, as shown in FIGS. 1 and 4, the temperature measurement unit 71 has a columnar outer shape. The direction in which the column extends is the first direction D. Although the temperature measurement unit 71 has a columnar outer shape in this example, the temperature measurement unit 71 may have a prismatic (e.g., quadrangular prismatic) or rectangular parallelepiped outer shape. For example, in the case where the temperature measurement unit 71 has a structure in which the heat sensitive element is covered by a protective member (e.g., a protective tube etc.), the outer shape of the temperature measurement unit 71 is determined by the outer shape of the protective member. For example, the protective member can be a member made of a synthetic resin (e.g., a fluororesin etc.).

As shown in FIG. 1, in the present embodiment, the temperature measurement unit 71 is disposed so that the first direction D matches the circumferential direction C. In the present embodiment, the first direction D is a direction along a straight line. Accordingly, in the present embodiment, the expression "the first direction D matches the circumferential direction C" means that the crossing angle, as viewed in the axial direction L, between the first direction D and a tangent to an arc in the circumferential direction C at the position in the circumferential direction C (e.g., the middle position in the circumferential direction C) of the temperature measurement unit 71 is equal to or smaller than a predetermined angle (e.g., 10 degrees or less). For example, the temperature measurement unit 71 can be disposed so that the first direction D is parallel to the tangent. In the case where the first direction D matches a direction along the arc, the expression "the first direction D matches the circumferential direction C" can be defined as the crossing angle, as viewed in the axial direction L, between a tangent to an arc in the first direction D at the position in the circumferential direction C (e.g., the middle position in the circumferential direction C) of the temperature measurement unit 71 and a tangent to an arc in the circumferential direction C at this position in the circumferential direction C is equal to or smaller than a predetermined angle (e.g., 10 degrees or less).

In the present embodiment, as shown in FIG. 4, the temperature measurement unit 71 is disposed so as to be surrounded along its entire circumference by a plurality of jumper portions 40 and the coil-end end face 35a (specifically, a plurality of connection portions 31 forming the coil-end end face 35a). Specifically, the temperature measurement unit 71 is disposed so as to be surrounded along its entire circumference by a plurality of jumper portions 40 and a plurality of connection portions 31 forming the coil-end end face 35a in a section (see FIG. 4) including the axis A of the core 10 and passing through the temperature measurement unit 71. The expression "surrounded along its entire circumference" means that, in the case where the circumferential direction based on an axis (central axis) passing through the center of the temperature measurement unit 71 and extending in the first direction D is a target circumferential direction and the space around the temperature measurement unit 71 is divided into N parts in the target circumferential direction (where N is an integer equal to or larger than 3), at least one jumper part 40 or connection portion 31 is present in each of the divided spaces. The larger the value of "N" is, the higher the density of the jumper portions 40 surrounding the temperature measurement unit 71 is. In this example, the temperature measurement unit 71 is disposed so that a radial line extending from the central axis of the temperature measurement unit 71 outward in the radial direction based on the central axis crosses a jumper portion 40 or a connection portion 31 to whatever position in the circumferential direction based on the central axis the radial line extends.

In the present embodiment, as shown in FIG. 4, the temperature measurement unit 71 is disposed so as to contact the coil-end end face 35a. An adhesive may be present between the temperature measurement unit 71 and the coil-end end face 35a. In the present embodiment, the temperature measurement unit 71 is disposed so as to contact the middle part in the radial direction R of the coil-end end face 35a (in this example, the part formed by the connection portions 31 of the U-phase coils 20U). A plurality of jumper portions 40 are disposed so as to cover the temperature measurement unit 71 from outside in the axial direction L and both sides in the radial direction R. In this case, it is preferable that as many jumper portions 40 as possible contact the temperature measurement unit 71. In order to secure a large contact area between the temperature measurement unit 71 and the jumper portions 40, it is preferable that the diameter of a section of the temperature measurement unit 71 perpendicular to the first direction D be larger than the diameter of a single jumper portion 40. For example, the diameter of the section of the temperature measurement unit 71 perpendicular to the first direction D may be a value in the range from two to three times the diameter of a single jumper portion 40.

As described above, in the present embodiment, the temperature measurement unit 71 is disposed so as to be surrounded along its entire circumference by a plurality of jumper portions 40 and a plurality of connection portions 31 forming the coil-end end face 35a. In order to improve the capability of the temperature detection device 70 to detect the temperature of the coil 20 (accuracy of the temperature, capability to follow the temperature, etc.), it is preferable that a larger number of jumper portions 40 be disposed so as to surround the temperature measurement unit 71. In this regard, as described above, each of the jumper portions 40 disposed on the same side in the axial direction L of the core 10 as the temperature measurement unit 71 is disposed so as to extend from the connection portion 40a toward the first side C1 in the circumferential direction along the coil-end end face 35a. In the present embodiment, the temperature measurement unit 71, the plurality of extended portions 43, and the neutral terminal 51 are arranged in this order toward the first side C1 in the circumferential direction. Accordingly, as can be seen from FIG. 5, the number of jumper portions 40 located at each position in the circumferential direction C increases from the neutral terminal 51 toward the first side C1 in the circumferential direction up to the region in the circumferential direction C where the plurality of extended portions 43 are disposed. All of the jumper portions 40 included in the coil 20 (in the present embodiment, (12×M) jumper portions 40) are disposed in the region in the circumferential direction C between the connection portion 40a located closest to the first side C1 in the circumferential direction with respect to the neutral terminal 51 and the plurality of extended portions 43. This configuration makes it easy to ensure that a large number of connection portions 31 are disposed so as to surround the temperature measurement unit 71.

Figure 6:
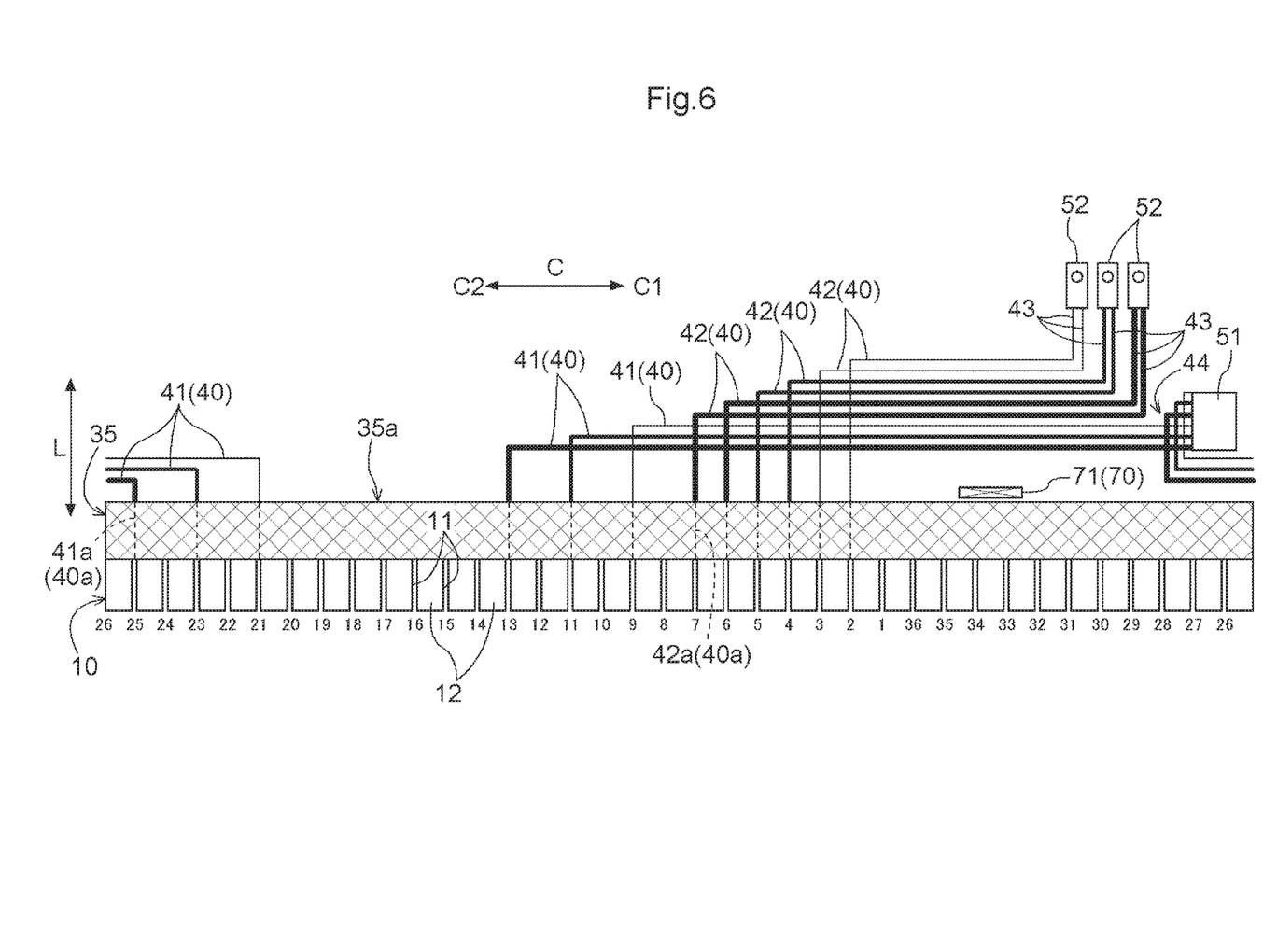
FIG. 6 is a development view showing the arrangement and configuration of a plurality of jumper portions according to a comparative example.

It can be seen from a comparative example shown in FIG. 6 that the above configuration makes it easy to ensure that a large number of connection portions 31 are disposed so as to surround the temperature measurement unit 71 as described above. Although the comparative example shown in FIG. 6 is not an embodiment of the stator according to the present disclosure, the same reference characters as those in FIG. 5 are used in order to facilitate understanding. In the comparative example shown in FIG. 6, unlike the example shown in FIG. 5, those jumper portions 40 whose connection portions 40a are located in the region in the circumferential direction C between the neutral terminal 51 and a boundary are disposed so as to extend from the connection portions 40a toward the second side C2 in the circumferential direction along the coil-end end face 35a. The boundary is a position in the circumferential direction C which is located on the first side C1 in the circumferential direction with respect to the neutral terminal 51 and on the second side C2 in the circumferential direction with respect to the plurality of extended portions 43. Accordingly, in the comparative example shown in FIG. 6, the number of jumper portions 40 disposed at each position in the circumferential direction C decreases toward the first side C1 in the circumferential direction in the region in the circumferential direction C between the neutral terminal 51 and the boundary, and increases toward the first side C1 in the circumferential direction in the region in the circumferential direction C between the boundary and the plurality of extended portions 43. As a result, in the comparative example shown in FIG. 6, there is no region where all of the jumper portions 40 included in the coil 20 are disposed, and the maximum number of connection portions 31 that can be disposed so as to surround the temperature measurement unit 81 is smaller than in the example shown in FIG. 5.

As described above with reference to FIG. 5, in the stator 1 according to the present embodiment, the number of jumper portions 40 disposed at each position in the circumferential direction C increases as from the neutral terminal 51 toward the first side C1 in the circumferential direction up to the region in the circumferential direction C where the plurality of extended portions 43 are disposed. In view of this, in the configuration in which the plurality of extended portions 43 are disposed in the region of 180 degrees or less in the circumferential direction C from the temperature measurement unit 71 toward the first side C1 in the circumferential direction, the temperature measurement unit 71 can be placed at a position in the circumferential direction C where a larger number of jumper portions 40 are disposed, as compared to the case where none of the extended portions 43 is disposed in the region of 180 degrees or less in the circumferential direction from the temperature measurement unit 71 toward the first side C1 in the circumferential direction. In the present embodiment, all of the extended portions 43 (in the present embodiment, (6×M) extended portions 43) are disposed in the region of 180 degrees or less in the circumferential direction C from the temperature measurement unit 71 toward the first side C1 in the circumferential direction. In the present embodiment, as shown in FIGS. 1 to 5, the temperature measurement unit 71 is disposed at the position in the circumferential direction C between the connection portion 40a located closest to the first side C1 in the circumferential direction with respect to the neutral terminal 51 and the plurality of extended portions 43, namely at the position in the circumferential direction C where the largest number of jumper portions 40 are disposed.

As described above, each of the jumper portions 40 located on the same side in the axial direction L of the core 10 as the temperature measurement unit 71 is disposed so as to extend from the connection portion 40a toward the first side C1 in the circumferential direction along the coil-end end face 35a. This configuration is advantageous in that it can reduce the size in the axial direction L of the stator 1. This will be described below. The same number of first jumper portions 41 (in the example shown in FIG. 1, six first jumper portions 41) as the product of the number of phase coils included in the coil 20, the number of coil portions 60 included in each phase coil (the number of parallel circuits in each phase coil), and the value of "M" described above are connected to the neutral terminal 51. That is, a relatively large number of first jumper portions 41 are connected to the neutral terminal 51. Accordingly, the neutral terminal 51 is a relatively large member, and the neutral terminal 51 is usually a portion that is located at the highest position in the axial direction L (in other words, a portion located farthest in the axial direction L from the core 10). For example, the neutral terminal 51 is a sleeve-like member having the plurality of first jumper portions 41 inserted therein from the same direction (in the example shown in FIG. 1, from the second side C2 in the circumferential direction) and crimped and fixed therein. As shown in FIGS. 1 and 5, the neutral terminal 51 is often placed outside the coil-end end face 35a in the axial direction L. Accordingly, the dimension in the axial direction L of the stator 1 tends to be determined according to the separation distance in the axial direction L between the neutral terminal 51 and the coil-end end face 35a, and for reduction in size in the axial direction L of the stator 1, it is desirable to reduce the separation distance between the neutral terminal 51 and the coil-end end face 35a.

In this regard, as can be seen from comparison between FIG. 5 and the comparative example shown in FIG. 6, in the stator 1 according to the present embodiment, each of the jumper portions 40 located on the same side in the axial direction L of the core 10 as the temperature measurement unit 71 is disposed so as to extend from the connection portion 40a toward the first side C1 in the circumferential direction along the coil-end end face 35a. The number of jumper portions 40 that are disposed between the neutral terminal 51 and the coil-end end face 35a can thus be reduced, and in the example shown in FIG. 5, no jumper portion 40 is disposed between the neutral terminal 51 and the coil-end end face 35a. This allows the neutral terminal 51 to be disposed closer to the coil-end end face 35a, whereby the size in the axial direction L of the stator 1 can be reduced. As shown in FIG. 4, at the position in the circumferential direction C where the temperature measurement unit 71 is disposed, the region in the axial direction L where the jumper portions 40 are disposed is expanded outward in the axial direction L according to the width in the axial direction L of the temperature measurement unit 71. Even in this case, however, the outer end in the axial direction L of the region in the axial direction L where the jumper portions 40 are disposed is usually located closer to the core 10 than the outer end in the axial direction L of the neutral terminal 51. Accordingly, even though the region in the axial direction L where the jumper portions 40 are disposed is expanded at the position in the circumferential direction C where the temperature measurement unit 71 is disposed, such expansion is less likely to cause problems.

Moreover, in the case of the comparative example shown in FIG. 6, each of those jumper portions 40 which extend from the connection portions 40a toward the second side C2 in the circumferential direction along the coil-end end face 35a has a folded-back portion 44 formed to reverse the direction in which the jumper portion 40 extends in the circumferential direction C in order to connect the jumper portion 40 to the neutral terminal 51. In the stator 1 according to the present embodiment, however, no such folded-back portions 44 are formed, as can be seen from FIG. 5. This configuration also makes it easy to dispose the neutral terminal 51 closer to the coil-end end face 35a. That is, each of those jumper portions 40 which are located on the same side in the axial direction L of the core 10 as the temperature measurement unit 71 is disposed so as to extend from the connection portion 40a toward the same side in the circumferential direction C along the coil-end end face 35a, whereby the number of folded-back portions that are formed in the jumper portions 40 in order to change (reverse) the direction in which the jumper portions 40 extend can be reduced or the configuration in which no folded-back portion is formed in the jumper portions 40 can be implemented. As a result, the region in the axial direction L where the jumper portions 40 are placed can be reduced in size (that is, the jumper portions 40 can be reduced in size in the axial direction L), whereby reduction in size in the axial direction L of the stator 1 can be achieved.

OTHER EMBODIMENTS

Other embodiments of the stator for a rotating electrical machine will be described below. The configurations disclosed in each of the following embodiments may be combined with the configurations disclosed in other embodiments unless inconsistency arises.

(1) The above embodiment is described with respect to an example in which the temperature measurement unit 71 of the temperature detection device 70 is disposed between the coil-end end face 35a and the jumper portions 40. However, the present disclosure is not limited to such a configuration. The temperature measurement unit 71 of the temperature detection device 70 may be disposed at a different position. For example, the temperature measurement unit 71 of the temperature detection device 70 may be disposed so as to contact an end face in the radial direction R (e.g., the outer end face in the radial direction R) of the coil end portion 35, or the temperature measurement unit 71 of the temperature detection device 70 may be disposed so as to contact a collection of a plurality of jumper portions 40 from outside in the axial direction L. The above embodiment is described with respect to an example in which the stator 1 includes the temperature detection device 70. However, the stator 1 may not include the temperature detection device 70.

(2) The above embodiment is described with respect to an example in which the neutral terminal 51 is disposed so that the entire neutral terminal 51 is located in a region located outside the coil end portion 35 in the axial direction L and overlapping the core 10 as viewed in the axial direction L. However, the present disclosure is not limited to such a configuration. The neutral terminal 51 may be disposed so that at least a part of the neutral terminal 51 is not overlapping the core 10 as viewed in the axial direction L.

(3) The above embodiment is described with respect to an example in which the power line terminals 52 are disposed so that the entire power line terminals 52 do not overlap the core 10 as viewed in the axial direction L. However, the present disclosure is not limited to such a configuration. The second jumper portions 42 may not have the extended portions 43 and the power line terminals 52 may be disposed so that each power line terminal 52 is partially or entirely located in a region located outside the coil end portion 35 in the axial direction L and overlapping the core 10 as viewed in the axial direction L. This configuration can also achieve reduction in size in the axial direction L of the stator 1 as described below.

As can be seen from the description of the above embodiment, the same number of second jumper portions 42 as the product of the number of coil portions 60 included in each phase coil (the number of parallel circuits in each phase coil) and the value of "M" described above (the number of linear conductors forming a single bundle) are connected to the power line terminal 52 of each phase. That is, there is a case where a plurality of second jumper portions 42 are connected to the power line terminal 52 of each phase. In this regard, as described in the above embodiment, each of the plurality of second jumper portions 42 is disposed so as to extend from the second connection portion 42a toward the first side C1 in the circumferential direction along the coil-end end face 35a. Accordingly, in the case where members each having the plurality of second jumper portions 42 inserted therein from the same direction and crimped and fixed therein are used as the power line terminals 52, no folded-back portion (portion similar to that the folded-back portion 44 shown in FIG. 6) that is formed to reverse the direction in which the second jumper portion 42 extends in the circumferential direction C need be formed in any of the second jumper portions 42. This configuration allows the power line terminals 52 to be disposed closer to the coil-end end face 35a, whereby reduction in size in the axial direction L of the stator 1 can be achieved.

(4) The above embodiment is described with respect to an example in which all of the extended portions 43 are disposed in the region of 180 degrees or less in the circumferential direction C from the temperature measurement unit 71 toward the first side C1 in the circumferential direction. However, the present disclosure is not limited to such a configuration. One or more of a part of the plurality of extended portions 43 included in the coil 20 may be disposed in the region of 180 degrees or less in the circumferential direction C from the temperature measurement unit 71 toward the first side C1 in the circumferential direction. None of the extended portions 43 may be disposed in the region of 180 degrees or less in the circumferential direction C from the temperature measurement unit 71 toward the first side C1 in the circumferential direction. Even in such a configuration, it is ensured that an appropriate number of connection portions 31 are disposed so as to surround the temperature measurement unit 71, depending on, e.g., the number of jumper portions 40 included in the coil 20 and the positions in the circumferential direction C where the connection portions 40*a* of the jumper portions 40 are disposed.

(5) The above embodiment is described with respect to an example in which the temperature measurement unit 71, the plurality of extended portions 43, and the neutral terminal 51 are arranged in this order toward the first side C1 in the circumferential direction. However, the present disclosure is not limited to such a configuration. As shown in an example of FIGS. 7 and 8, the temperature measurement unit 71, the neutral terminal 51, and the plurality of extended portions 43 may be arranged in this order toward the first side C1 in the circumferential direction. In this case, by disposing the neutral terminal 51 in the region of 180 degrees or less in the circumferential direction from the temperature measurement unit 71 toward the first side C1 in the circumferential direction, the temperature measurement unit 71 can be disposed at a position in the circumferential direction C where a larger number of jumper portions 40 are disposed, as compared to the case where the neutral terminal 51 is not disposed in the region of 180 degrees or less in the circumferential direction from the temperature measurement unit 71 toward the first side C1 in the circumferential direction. Depending on the number of jumper portions 40 included in the coil 20 and the positions in the circumferential direction C where the connection portions 40*a* of the jumper portions 40 are disposed, the neutral terminal 51 may not be disposed in the region of 180 degrees or less in the circumferential direction C from the temperature measurement unit 71 toward the first side C1 in the circumferential direction.

Figure 7:
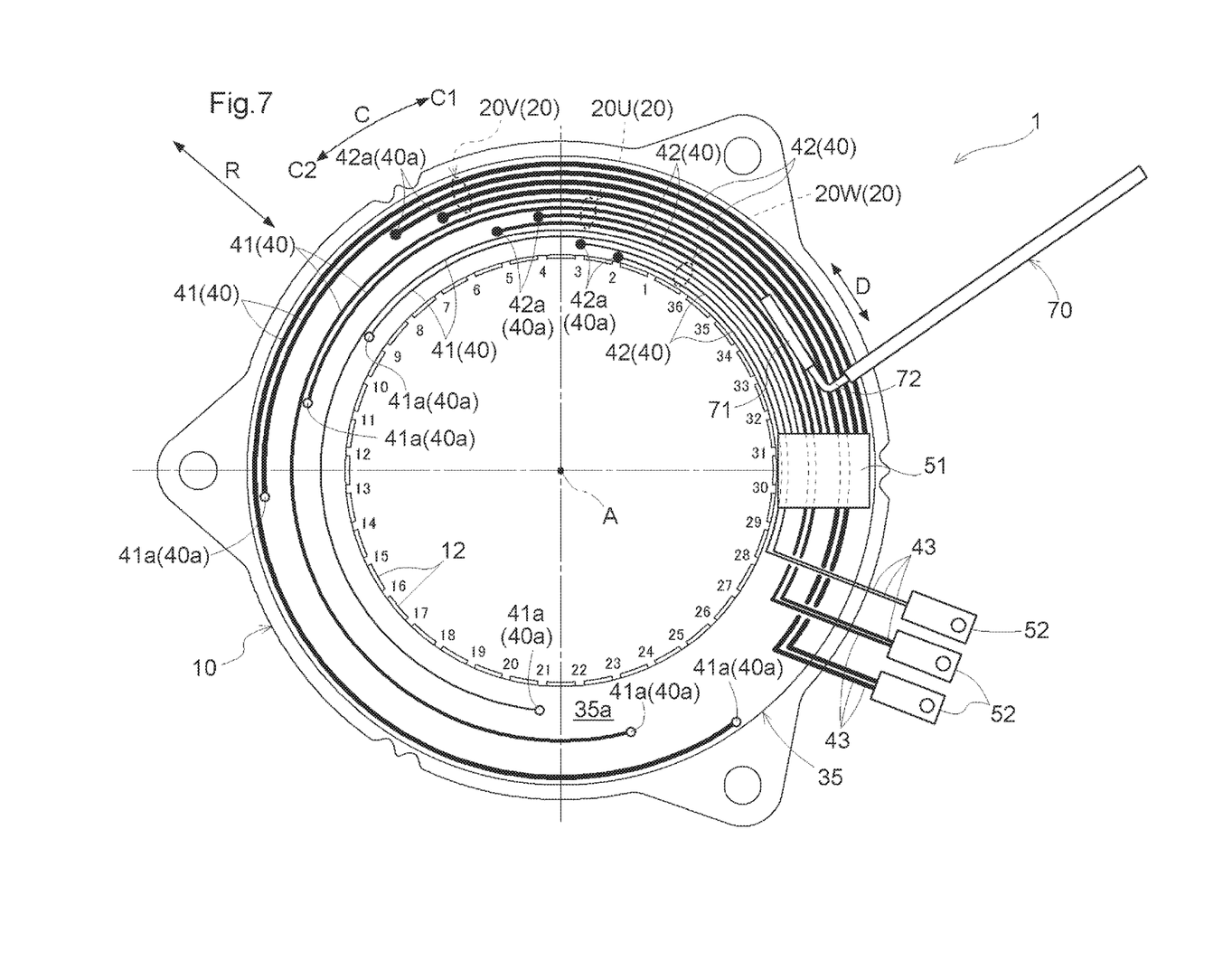
FIG. 7 is a view schematically showing the arrangement and configuration of jumper portions of a coil and a temperature detection device with respect to a core according to another embodiment.

In the example shown in FIGS. 7 and 8, unlike the present embodiment, the jumper portions 40 (second jumper portions 42) are disposed between the neutral terminal 51 and the coil-end end face 35*a*. That is, in this example, the neutral terminal 51 is disposed so that the entire neutral terminal 51 is located in a region located outside the jumper portions 40 (second jumper portions 42) as well as the coil end portion 35 in the axial direction L and overlapping the core 10 as viewed in the axial direction L. In this case as well, since the folded-back portions 44 described above are not formed, the neutral terminal 51 can be disposed closer to the coil-end end face 35*a* accordingly, whereby reduction in size in the axial direction L of the stator 1 can be achieved.

(6) The above embodiment is described with respect to an example in which both the first jumper portions 41 and the second jumper portions 42 are disposed on the same side in the axial direction L of the core 10 as the temperature measurement unit 71 and each of those jumper portions 40 which are disposed on the same side in the axial direction L of the core 10 as the temperature measurement unit 71 is disposed so as to extend from the connection portion 40*a* toward the first side C1 in the circumferential direction along the coil-end end face 35*a*. However, the present disclosure is not limited to such a configuration. Even in the case where both the first jumper portions 41 and the second jumper portions 42 are disposed on the same side in the axial direction L of the core 10 as the temperature measurement unit 71, namely even in the case where both the first jumper portions 41 and the second jumper portions 42 are disposed on the same side in the axial direction L of the core 10, the "jumper portions 40" in the case where "each of the jumper portions 40 is disposed so as to extend from the connection portion 40*a* toward the first side C1 in the circumferential direction along the coil-end end face 35*a*" may be only either the first jumper portions 41 or the second jumper portions 42. That is, in this case, the "plurality of jumper portions 40 that are at least either the first jumper portions 41 or the second jumper portions 42" are interpreted as either the first jumper portions 41 or the second jumper portions 42. For example, in the case where both the first jumper portions 41 and the second jumper portions 42 are disposed on the same side in the axial direction L of the core 10 as the temperature measurement unit 71, each of the first jumper portions 41 and a part of the second jumper portions 42 can be disposed so as to extend from the connection portions 40*a* toward the first side C1 in the circumferential direction along the coil-end end face 35*a*, and the remainder of the second jumper portions 42 can be disposed so as to extend from the connection portions 40*a* toward the second side C2 in the circumferential direction along the coil-end end face 35*a*. For example, in the configuration in which the temperature measurement unit 71, the plurality of extended portions 43, and the neutral terminal 51 are arranged in this order toward the first side C1 in the circumferential direction, the second jumper portions 42 whose second connection portions 42*a* are disposed between the plurality of extended portions 43 and the neutral terminal 51 in the circumferential direction C can be disposed so as to extend from the second connection portions 42*a* toward the second side C2 in the circumferential direction along the coil-end end face 35*a*.

(7) The above embodiment is described with respect to an example in which the coil 20 includes both a plurality of first jumper portions 41 and a plurality of second jumper portions 42. That is, the above embodiment is described with respect to an example in which the coil 20 is comprised of a plurality of phase coils connected in star. However, the present disclosure is not limited to such a configuration. The coil 20 may be comprised of a plurality of phase coils connected in delta. In this case, the coil 20 includes only the second jumper portions 42 out of the first jumper portions 41 and the second jumper portions 42.

(8) The above embodiment is described with respect to an example in which each of the phase coils includes two coil portions 60 connected in parallel with each other. However, the present disclosure is not limited to such a configuration. Each of the phase coils may include three or more coil portions 60 connected in parallel with each other, or each of the phase coils may include only one coil portion 60.

(9) The above embodiment is described with respect to an example in which the linear conductors forming the coil 20 are linear conductors having a circular section perpendicular to the direction in which the linear conductor extends. However, the present disclosure is not limited to such a configuration. The linear conductors forming the coil 20 may be linear conductors having a polygonal (e.g., quadrilateral etc.) section perpendicular to the direction in which the linear conductor extends.

(10) The above embodiment is described with respect to an example in which the stator 1 is a stator for an inner rotor type rotating electrical machine. However, the present disclosure is not limited to such a configuration. The stator 1 may be a stator for an outer rotor type rotating electrical machine. In this case, the extended portions 43 are formed so as to extend the second jumper portions 42 to the inside in the radial direction R of the coil end portion 35.

(11) It should be understood that, regarding other configurations as well, the embodiments disclosed in the specification are by way of example only in all respects. Accordingly, those skilled in the art may make various modifications as appropriate without departing from the spirit and scope of the present disclosure.

SUMMARY OF EMBODIMENT

Summary of the stator for a rotating electrical machine described above will be given below.

A stator (1) for a rotating electrical machine which includes a core (10) having a plurality of slots (11) extending in an axial direction (L) and arranged in a circumferential direction (C), and a coil (20) wound in the core (10), wherein the coil (20) includes slot accommodated portions (30) that are placed in the slots (11), a coil end portion (35) that projects from the core (10) in the axial direction (L), and a plurality of jumper portions (40) that are extended from the slot accommodated portions (30) and disposed outside the coil end portion (35) in the axial direction (L) and that are at least either first jumper portions (41) connected to a neutral terminal (51) that forms a neutral point (50) and second jumper portions (42) connected to a power line terminal (52) that is connected to a power supply, and each of the jumper portions (40) is disposed so as to extend from a connection portion (40a) with the slot accommodated portion (30) toward a first side (C1) in the circumferential direction along a coil-end end face (35a) that is an end face in the axial direction (L) of the coil end portion (35), the first side (C1) in the circumferential direction being one side in the circumferential direction (C).

With the above configuration, each of the jumper portions (40) is disposed so as to extend from the connection portion (40a) with the slot accommodated portion (30) toward the first side (C1) in the circumferential direction along the coil-end end face (35a), namely so as to extend toward the same side in the circumferential direction (C). Accordingly, for example, in the case where the neutral terminal (51) to which the plurality of first jumper portions (41) are connected is disposed outside the coil end portion (35) in the axial direction (L), the plurality of first jumper portions (41) can be made to extend toward the same side in the circumferential direction (C) by merely disposing the plurality of first jumper portions (41) so that each of the first jumper portions (41) extends to a position in the circumferential direction (C) which corresponds to a position where the neutral terminal (51) is disposed. That is, the plurality of first jumper portions (41) can be connected at the neutral terminal (51) without forming in the first jumper portions (41) folded-back portions that reverse the direction in which the first jumper portions (41) extend in the circumferential direction (C). Accordingly, the neutral terminal (51) can be disposed closer to the coil-end end face (35a) as compared to the case where such folded-back portions are formed in the first jumper portions (41), whereby reduction in size in the axial direction (L) of the stator (1) can be achieved. Similarly, for example, in the case where the power line terminal (52) to which the plurality of second jumper portions (42) are connected is disposed outside the coil end portion (35) in the axial direction (L), the plurality of second jumper portions (42) can be made to extend toward the same side in the circumferential direction (C) by merely disposing the plurality of second jumper portions (42) so that each of the second jumper portions (42) extends to a position in the circumferential direction (C) which corresponds to a position where the power line terminal (52) is disposed. That is, the plurality of second jumper portions (42) can be connected at the power line terminal (52) without forming in the second jumper portions (42) folded-back portions that reverse the direction in which the second jumper portions (42) extend in the circumferential direction (C). Accordingly, the power line terminal (52) can be disposed closer to the coil-end end face (35a) as compared to the case where such folded-back portions are formed in the second jumper portions (42), whereby reduction in size in the axial direction of the stator (1) can be achieved. Since each of the jumper portions (40) is merely disposed so as to extend from the connection portion (40a) with the slot accommodated portion (30) toward the first side (C1) in the circumferential direction along the coil-end end face (35a), this configuration does not require any special processing and does not significantly affect manufacturing cost.

According to the above configuration, a stator (1) for a rotating electrical machine can be implemented which can achieve reduction in size in the axial direction (L) while avoiding an increase in manufacturing cost.

It is preferable that at least one of the entire neutral terminal (51) and the entire power line terminal (52) be disposed in a region located outside the coil end portion (35) in the axial direction (L) and overlapping the core (10) as viewed in the axial direction (L).

With this configuration, the area of a region in the radial direction (R) which is occupied by the stator (1) can be reduced. Even in the case where such arrangement and configuration are used, the neutral terminal (51) or the power line terminal (52) can be disposed closer to the coil-end end face (35a) as described above. Accordingly, the area of the region in the radial direction (R) which is occupied by the stator (1) can be reduced while achieving reduction in size in the axial direction (L) of the stator (1).

It is preferable that the stator (1) for the rotating electrical machine further include: a temperature detection device (70) that detects a temperature of the coil (20), and a temperature measurement unit (71) of the temperature detection device (70) be disposed between the coil-end end face (35a) and the jumper portions (40).

In this configuration, the temperature measurement unit (71) of the temperature detection device (70) is disposed between the coil-end end face (35a) and the jumper portions (40). In this case, by disposing the jumper portions (40) so that the jumper portions (40) at least partially surround the temperature measurement unit (71), the temperature measurement unit (71) is less affected by a temperature other than the temperature of conductor wires forming the coil (20), whereby the capability of the temperature detection device (70) to detect the coil temperature can be appropriately ensured. In this regard, as described above, each of the jumper portions (40) is disposed so as to extend from the connection portion (40a) with the slot accommodated portion (30) toward the first side (C1) in the circumferential direction along the coil-end end face (35a), namely so as to extend toward the same side in the circumferential direction (C). Accordingly, the number of jumper portions (40) disposed at each position in the circumferential direction (C) can be made to increase toward the first side (C1) in the circumferential direction. As a result, the temperature measurement unit (71) of the temperature detection device (70) can be located at a position where the number of jumper portions (40) required to at least partially surround the temperature measurement unit (71) are disposed. The capability of the temperature detection device (70) to detect the coil temperature can thus be appropriately ensured.

It is preferable that the coil (20) include both the plurality of first jumper portions (41) and the plurality of second jumper portions (42), each of the plurality of second jumper portions (42) be connected to the power line terminal (52) through an extended portion (43) extended to one side in a radial direction (R) of the coil end portion (35), the temperature measurement unit (71), a plurality of the extended portions (43), and the neutral terminal (51) be arranged in this order toward the first side (C1) in the circumferential direction, and the plurality of the extended portions (43) be disposed in a region of 180 degrees or less in the circumferential direction (C) from the temperature measurement unit (71) toward the first side (C1) in the circumferential direction.

With this configuration, the temperature measurement unit (71), the plurality of the extended portions (43), and the neutral terminal (51) are arranged in this order toward the first side (C1) in the circumferential direction. Accordingly, the number of jumper portions (40) disposed at each position in the circumferential direction (C) increases from the neutral terminal (51) toward the first side (C1) in the circumferential direction up to a region in the circumferential direction (C) where the plurality of extended portions (43) are disposed. With the above configuration, the plurality of the extended portions (43) are disposed in the region of 180 degrees or less in the circumferential direction (C) from the temperature measurement unit (71) toward the first side (C1) in the circumferential direction. Accordingly, the temperature measurement unit (71) can be disposed at a position in the circumferential direction (C) where a larger number of jumper portions (40) are disposed, as compared to the case where none of the extended portions (43) is disposed in the region of 180 degrees or less in the circumferential direction (C) from the temperature measurement unit (71) toward the first side (C1) in the circumferential direction. This makes it easy to dispose the jumper portions (40) so that the jumper portions (40) at least partially surround the temperature measurement unit (71).

Alternatively, it is preferable that the coil (20) include both the plurality of first jumper portions (41) and the plurality of second jumper portions (42), each of the plurality of second jumper portions (42) be connected to the power line terminal (52) through an extended portion (43) extended to one side in a radial direction (R) of the coil end portion (35), the temperature measurement unit (71), the neutral terminal (51), and a plurality of the extended portions (43) be arranged in this order toward the first side (C1) in the circumferential direction, and the neutral terminal (51) be disposed in a region of 180 degrees or less in the circumferential direction (C) from the temperature measurement unit (71) toward the first side (C1) in the circumferential direction.

With this configuration, the temperature measurement unit (71), the neutral terminal (51), and the plurality of the extended portions (43) are arranged in this order toward the first side (C1) in the circumferential direction. Accordingly, the number of jumper portions (40) disposed at each position in the circumferential direction (C) increases from the plurality of the extended portions (43) toward the first side (C1) in the circumferential direction up to a region in the circumferential direction (C) where the neutral terminal (51) is disposed. With the above configuration, the neutral terminal (51) is disposed in the region of 180 degrees or less in the circumferential direction (C) from the temperature measurement unit (71) toward the first side (C1) in the circumferential direction. Accordingly, the temperature measurement unit (71) can be disposed at a position in the circumferential direction (C) where a larger number of jumper portions (40) are disposed, as compared to the case where the neutral terminal (51) is not disposed in the region of 180 degrees or less in the circumferential direction (C) from the temperature measurement unit (71) toward the first side (C1) in the circumferential direction. This makes it easy to dispose the jumper portions (40) so that the jumper portions (40) at least partially surround the temperature measurement unit (71).

It is preferable that the temperature measurement unit (71) be disposed so as to be surrounded along its entire circumference by the plurality of jumper portions (40) and the coil-end end face (35a).

With this configuration, the temperature measurement unit (71) can be surrounded along its entire circumference by conductor wires forming the coil (20) whose temperature is to be detected by the temperature detection unit (70) (the jumper portions (40) and conductor wires forming the coil-end end face (35a)). Accordingly, the temperature measurement unit (71) is further less affected by temperatures other than the temperature of the conductor wires forming the coil (20), whereby the capability of the temperature detection device (70) to detect the coil temperature can be improved.

It is preferable that the temperature measurement unit (71) have a columnar outer shape extending in a first direction (D), and the temperature measurement unit (71) be disposed so that the first direction (D) matches the circumferential direction (C).

With the above configuration, the temperature measurement unit (71) can be disposed so that the first direction (D) matches the direction in which the jumper portions (40) extend along the coil-end end face (35a). This makes it easy to at least partially surround the temperature measurement unit (71) by the jumper portions (40) along the entire length in the first direction (D) of the temperature measurement unit (71), whereby the capability to detect the coil temperature can be improved.

The invention claimed is:

1. A stator for a rotating electrical machine, the stator comprising:
  a core having a plurality of slots extending in an axial direction and arranged in a circumferential direction; and
  a coil wound in the core, wherein
    the coil includes slot accommodated portions that are placed in the slots, a coil end portion that projects from the core in the axial direction, and a plurality of jumper portions that are extended from the slot accommodated portions and disposed outside the coil end portion in the axial direction and that are at least either first jumper portions connected to a neutral terminal that forms a neutral point and second jumper portions connected to a power line terminal that is connected to a power supply, and
    each of the jumper portions is disposed so as to extend from a connection portion with the slot accommodated portion toward a first side in the circumferential direction along a coil-end end face that is an end face in the axial direction of the coil end portion, the first side in the circumferential direction being one side in the circumferential direction.

2. The stator for the rotating electrical machine according to claim 1, wherein
at least one of the entire neutral terminal and the entire power line terminal is disposed in a region located outside the coil end portion in the axial direction and overlapping the core as viewed in the axial direction.

3. The stator for the rotating electrical machine according to claim 2, further comprising:
a temperature detector that detects a temperature of the coil, wherein
a temperature measurer of the temperature detector is disposed between the coil-end end face and the jumper portions.

4. The stator for the rotating electrical machine according to claim 3, wherein
the coil includes both the plurality of first jumper portions and the plurality of second jumper portions,
each of the plurality of second jumper portions is connected to the power line terminal through an extended portion extended to one side in a radial direction of the coil end portion,
the temperature measurer, a plurality of the extended portions, and the neutral terminal are arranged in this order toward the first side in the circumferential direction, and
the plurality of extended portions are disposed in a region of 180 degrees or less in the circumferential direction from the temperature measurer toward the first side in the circumferential direction.

5. The stator for the rotating electrical machine according to claim 4, wherein
the temperature measurer is disposed so as to be surrounded along its entire circumference by the plurality of jumper portions and the coil-end end face.

6. The stator for the rotating electrical machine according to claim 5, wherein
the temperature measurer has a columnar outer shape extending in a first direction, and
the temperature measurer is disposed so that the first direction matches the circumferential direction.

7. The stator for the rotating electrical machine according to claim 3, wherein
the coil includes both the plurality of first jumper portions and the plurality of second jumper portions,
each of the plurality of second jumper portions is connected to the power line terminal through an extended portion extended to one side in a radial direction of the coil end portion,
the temperature measurer, the neutral terminal, and a plurality of the extended portions are arranged in this order toward the first side in the circumferential direction, and
the neutral terminal is disposed in a region of 180 degrees or less in the circumferential direction from the temperature measurer toward the first side in the circumferential direction.

8. The stator for the rotating electrical machine according to claim 1, further comprising:
a temperature detector that detects a temperature of the coil, wherein
a temperature measurer of the temperature detector is disposed between the coil-end end face and the jumper portions.

9. The stator for the rotating electrical machine according to claim 8, wherein
the coil includes both the plurality of first jumper portions and the plurality of second jumper portions,
each of the plurality of second jumper portions is connected to the power line terminal through an extended portion extended to one side in a radial direction of the coil end portion,
the temperature measurer, a plurality of the extended portions, and the neutral terminal are arranged in this order toward the first side in the circumferential direction, and
the plurality of the extended portions are disposed in a region of 180 degrees or less in the circumferential direction from the temperature measurer toward the first side in the circumferential direction.

10. The stator for the rotating electrical machine according to claim 9, wherein
the temperature measurer is disposed so as to be surrounded along its entire circumference by the plurality of jumper portions and the coil-end end face.

11. The stator for the rotating electrical machine according to claim 8, wherein
the coil includes both the plurality of first jumper portions and the plurality of second jumper portions,
each of the plurality of second jumper portions is connected to the power line terminal through an extended portion extended to one side in a radial direction of the coil end portion,
the temperature measurer, the neutral terminal, and a plurality of the extended portions are arranged in this order toward the first side in the circumferential direction, and
the neutral terminal is disposed in a region of 180 degrees or less in the circumferential direction from the temperature measurer toward the first side in the circumferential direction.

12. The stator for the rotating electrical machine according to claim 11, wherein
the temperature measurer is disposed so as to be surrounded along its entire circumference by the plurality of jumper portions and the coil-end end face.

13. The stator for the rotating electrical machine according to claim 8, wherein
the temperature measurer is disposed so as to be surrounded along its entire circumference by the plurality of jumper portions and the coil-end end face.

14. The stator for the rotating electrical machine according to claim 8, wherein
the temperature measurer has a columnar outer shape extending in a first direction, and
the temperature measurer is disposed so that the first direction matches the circumferential direction.

* * * * *